United States Patent
Beis (10) Patent No.: US 10,836,443 B1
(45) Date of Patent: Nov. 17, 2020

(54) MODULAR PAYLOAD BED WALL EXTENSION SYSTEM

(71) Applicant: Konstantinos Beis, Long Island City, NY (US)

(72) Inventor: Konstantinos Beis, Long Island City, NY (US)

( * ) Notice: Subject to any disclaimer, the term of this patent is extended or adjusted under 35 U.S.C. 154(b) by 55 days.

(21) Appl. No.: 16/430,905

(22) Filed: Jun. 4, 2019

(51) Int. Cl.
  *B62D 33/033* (2006.01)
  *B62D 33/02* (2006.01)
  *B60R 5/04* (2006.01)
  *B62D 33/027* (2006.01)

(52) U.S. Cl.
  CPC .......... *B62D 33/0207* (2013.01); *B60R 5/041* (2013.01); *B62D 33/027* (2013.01)

(58) Field of Classification Search
  CPC ............ B62D 33/0207; B62D 33/0222; B62D 33/023; B62D 33/027; B62D 53/067
  USPC ...................................................... 296/32, 36
  See application file for complete search history.

(56) References Cited

U.S. PATENT DOCUMENTS

| | | | | |
|---|---|---|---|---|
| 1,022,266 A | * | 4/1912 | Saltzman et al. | B62D 33/0207 296/36 |
| 4,542,911 A | * | 9/1985 | Mulligan | B60P 3/32 280/423.1 |
| 6,152,510 A | * | 11/2000 | Newsome | B62D 33/023 296/10 |
| 2007/0296197 A1 | * | 12/2007 | Duval | B62D 63/061 280/789 |

* cited by examiner

*Primary Examiner* — Dennis H Pedder (57) ABSTRACT

A modular payload bed wall extension system includes a pickup truck having a pickup bed and a perimeter wall including an upper edge with four corners, a tailgate, a first side wall, a second side wall and a back wall. Each of the first and second side walls has a side wall mount secured thereto. Each of the corners has a corner mount positioned thereon. A plurality of slats is provided and includes lateral slats and end slats. At least two lateral slats extend between the corner mounts on the first lateral wall. At least two lateral slats extend between the corner mounts on the second lateral wall. At least two end slats extend between the corner mounts on the back wall. A plurality of fasteners extends through the corner mounts and corresponding slats.

19 Claims, 10 Drawing Sheets

MODULAR PAYLOAD BED WALL EXTENSION SYSTEM

CROSS-REFERENCE TO RELATED APPLICATIONS

Statement Regarding Federally Sponsored Research or Development

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention

The invention relates to wall structures positionable on pickup trucks or the like to increase perimeter wall height for a bed thereof.

(2) Description of Related Art Including Information Disclosed Under 37 CFR 1.97 and 1.98

The disclosure and prior art relates to wall extending devices and more particularly pertains to a new wall extending device for positioning on the perimeter wall of a pickup truck bed in a semi-permanent manner so that the effective height of the perimeter wall is increased.

BRIEF SUMMARY OF THE INVENTION

An embodiment of the disclosure meets the needs presented above by generally comprising a pickup truck having a pickup bed and a perimeter wall extending upwardly therefrom. The perimeter wall has four corners and includes a tailgate, a first side wall, a second side wall and a back wall. The perimeter wall has an upper edge. A plurality of side wall mounts is positioned on the upper edge of each of the first and second side walls such that each has at least one of the side wall mounts positioned thereon. Each of the side wall mounts has at least one securing member extending therethrough and into the perimeter wall to secure the side wall mounts to the perimeter wall. A plurality of corner mounts is provided. Each of the corner mounts is positioned on and extends upwardly from one of the corners. A plurality of slats is provided. Each of the slats is elongated and has a first end and a second end. The plurality of slats includes a plurality of lateral slats and a plurality of end slats. At least two of the lateral slats extends between and is engaged with the corner mounts positioned on the first lateral wall. At least two of the lateral slats extends between and is engaged with the corner mounts positioned on the second lateral wall. A bottom one of the lateral slats on the first lateral wall and a bottom one of the slats on the second lateral wall is positioned in an associated one of the side wall mounts. At least two of the end slats extends between and is engaged with the corner mounts positioned on the back wall. The end slats extend into the first channels of respective ones of the corner mounts. A plurality of fasteners is provided and each of the fasteners extends through one of the corner mounts and into at least one of the slats.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DESCRIPTION OF THE INVENTION

With reference now to the drawings, and in particular to FIGS. 1 through 10 thereof, a new wall extending device embodying the principles and concepts of an embodiment of the disclosure and generally designated by the reference numeral 10 will be described.

As best illustrated in FIGS. 1 through 10, the modular payload bed wall extension system 10 generally comprises a system used with a conventional pickup truck 12 having a pickup bed 14 and a perimeter wall 16 extending upwardly therefrom. The perimeter wall 16 has an upper edge 18 and includes four corners 20. More particularly, the perimeter wall 16 includes a tailgate 22, a first side wall 24, a second side wall 26 and a back wall 28. The tailgate 22 is conventional and is pivotally coupled to the pickup bed 14 to facilitate access to the pickup bed 14.

A plurality of side wall mounts 30 is provided. The upper edge 18 of each of the first 24 and second 26 side walls has at least one of the side wall mounts 30 positioned thereon. As shown best in FIG. 5, each of the side wall mounts 30 has bottom wall 36, an inner wall 32 and an outer wall 34. A receiving space 38 is thereafter defined between the inner 32 and outer 34 walls. A plurality of securing members 40, such as bolts and nuts, are provided. Each of the side wall mounts 30 has at least one securing member 40 extending therethrough and into the perimeter wall 16 to secure the side wall mounts 30 to the perimeter wall 16. The side wall mounts 30 provide a base securing means between perimeter wall 16 and a remainder of the system 10.

Figure 1:
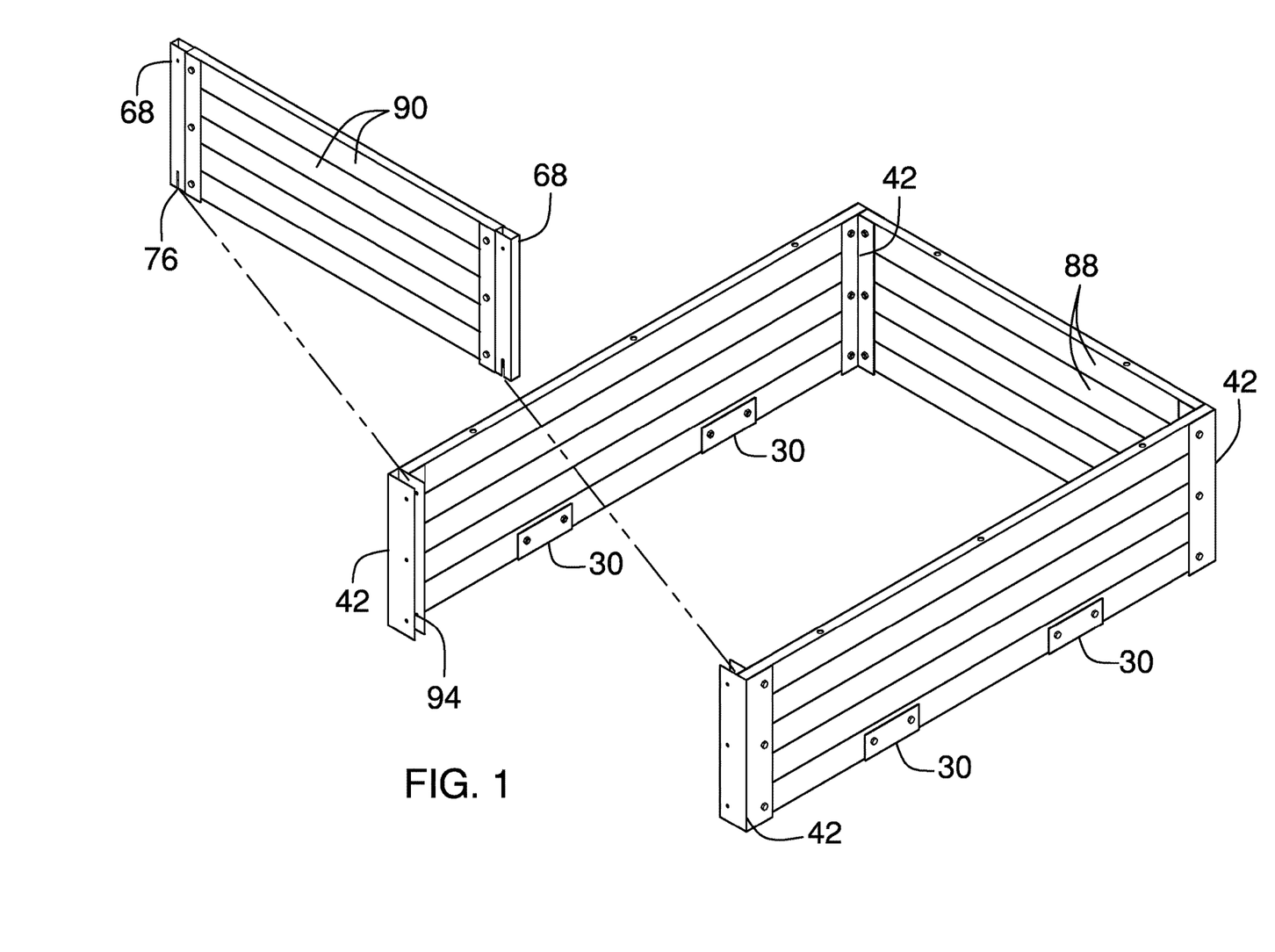
FIG. 1 is a rear isometric view of a modular payload bed wall extension system according to an embodiment of the disclosure.
Figure 2:
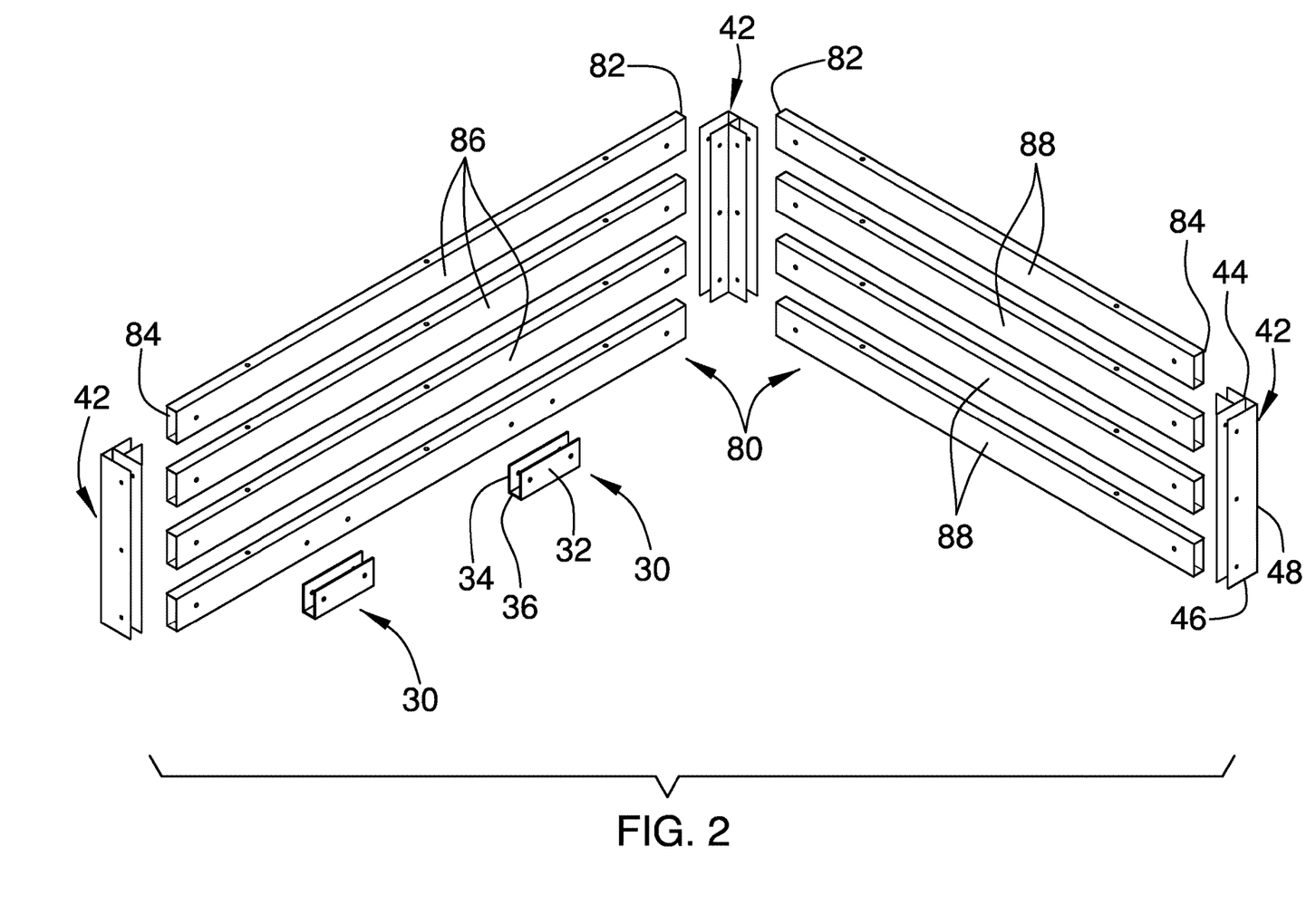
FIG. 2 is an exploded rear isometric view of an embodiment of the disclosure.
Figure 3:
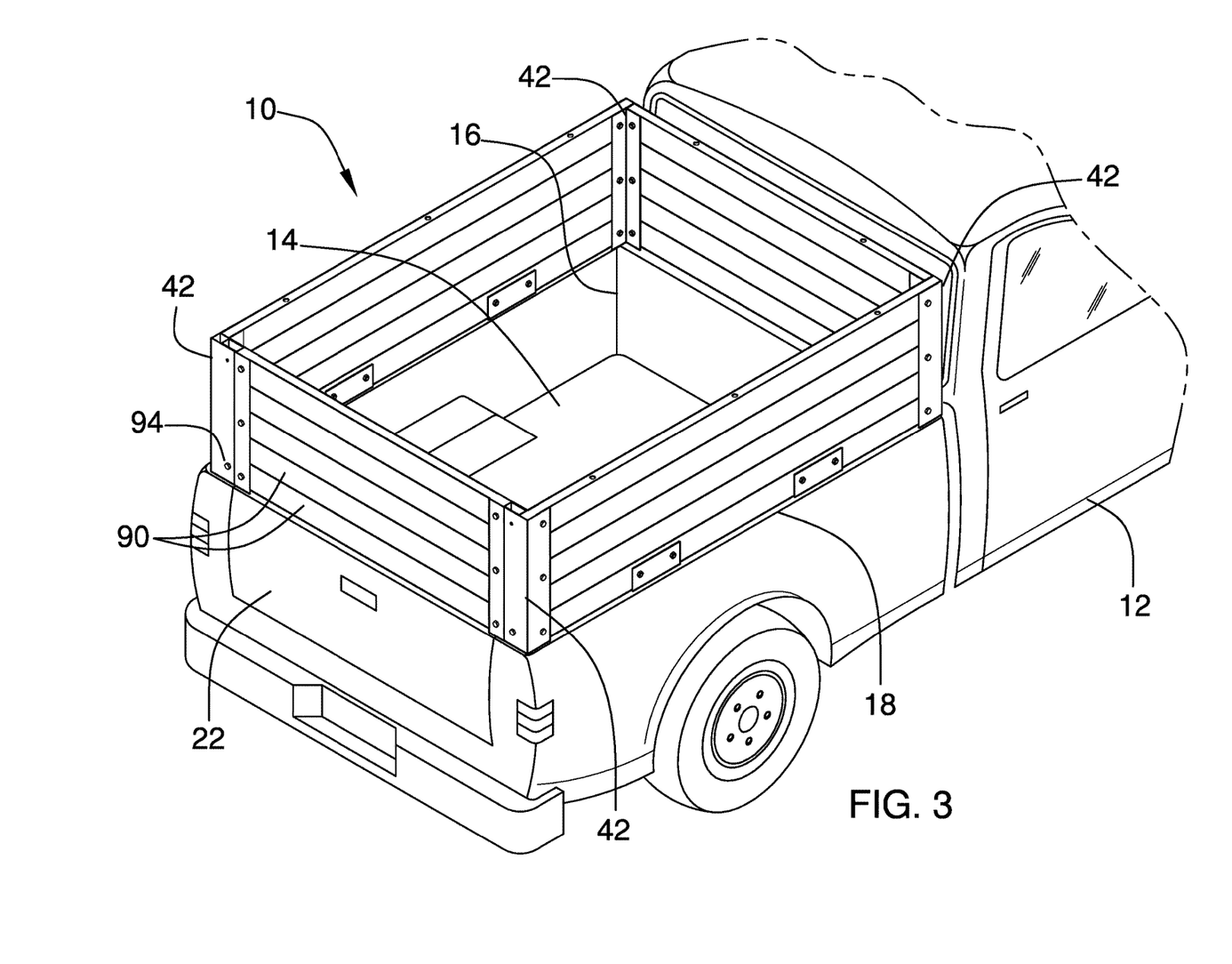
FIG. 3 is a rear isometric view of an embodiment of the disclosure.
Figure 4:
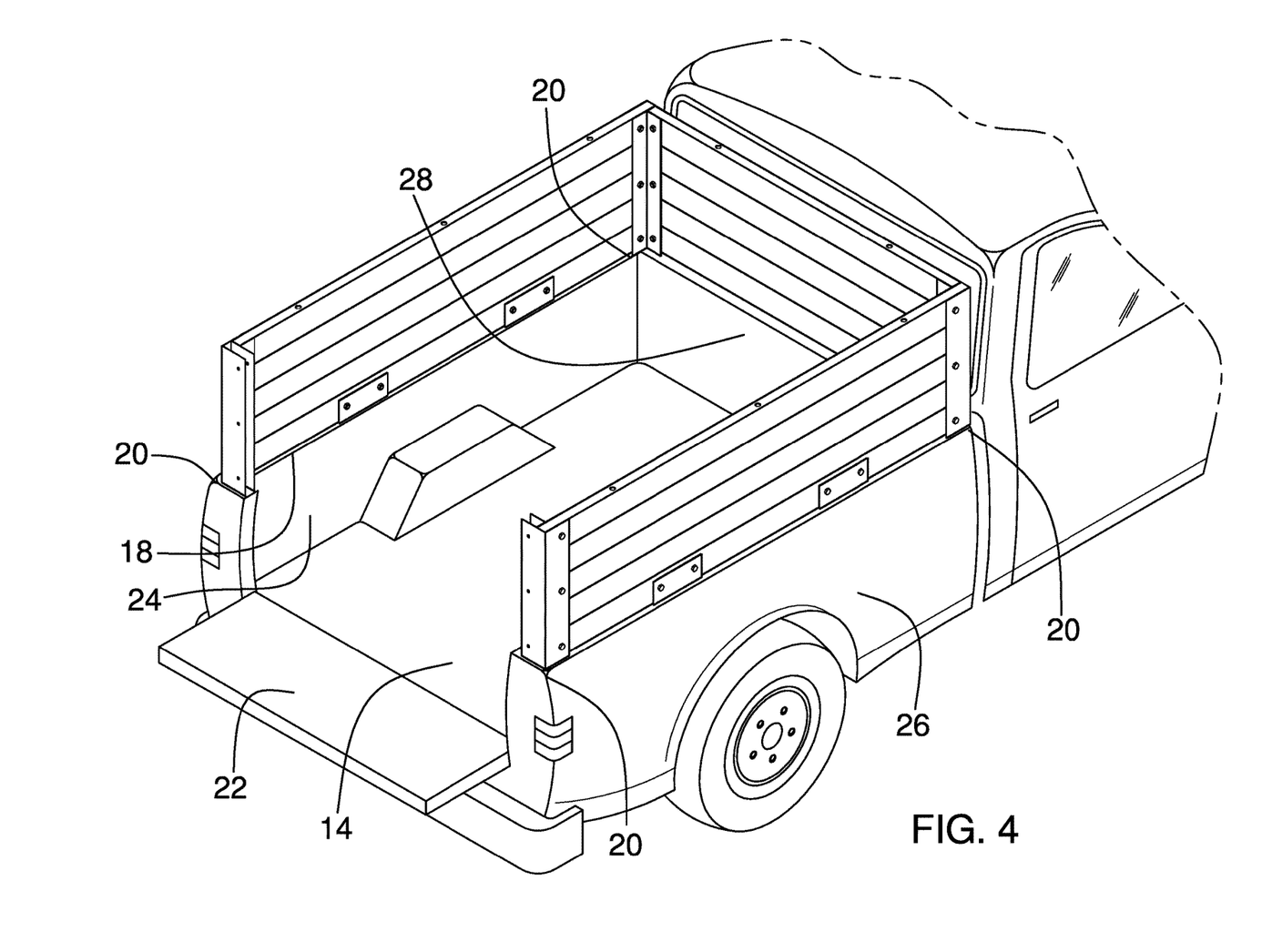
FIG. 4 is a rear isometric view of an embodiment of the disclosure.
Figure 5:
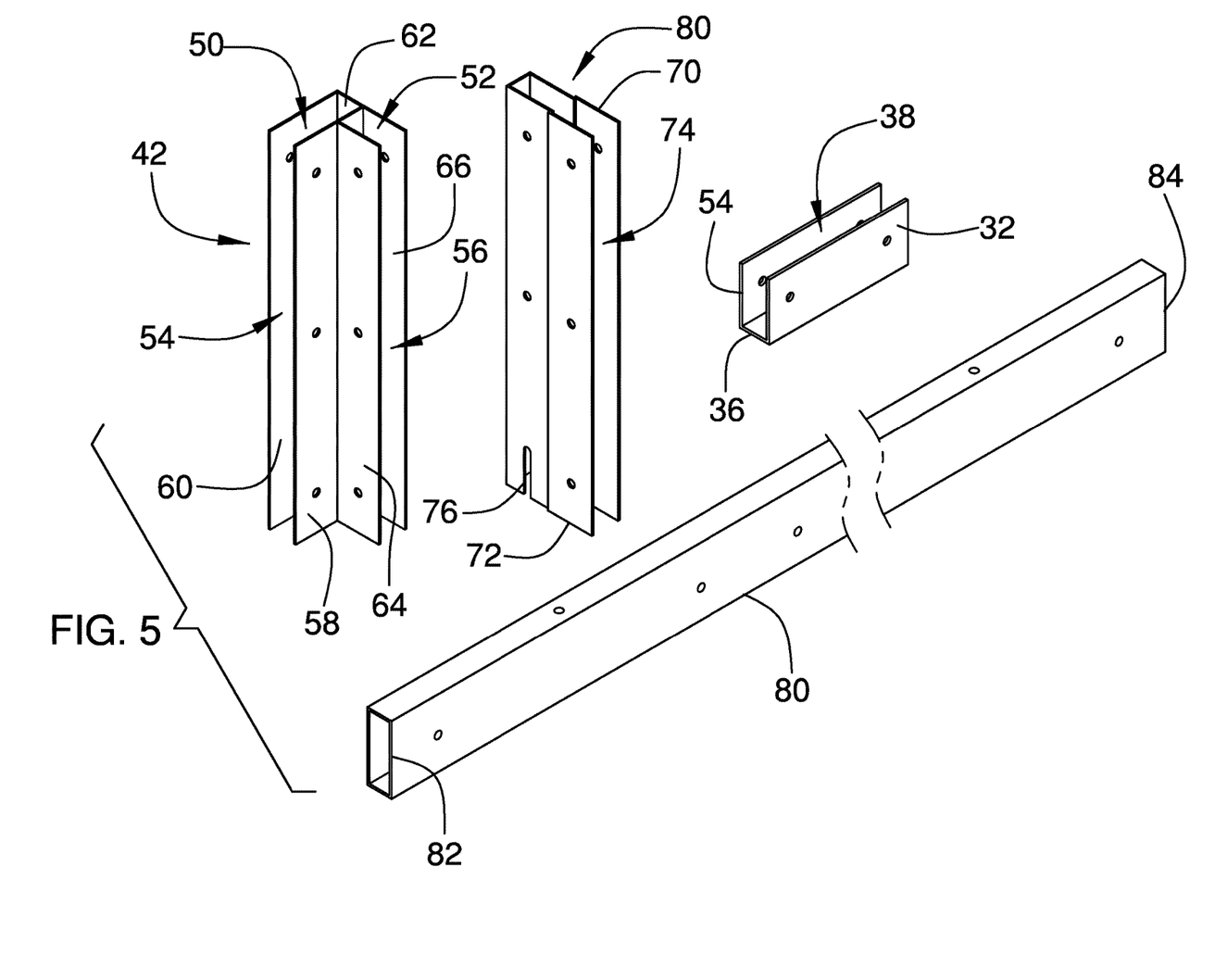
FIG. 5 is a isometric view of multiple components an embodiment of the disclosure.
Figure 6:
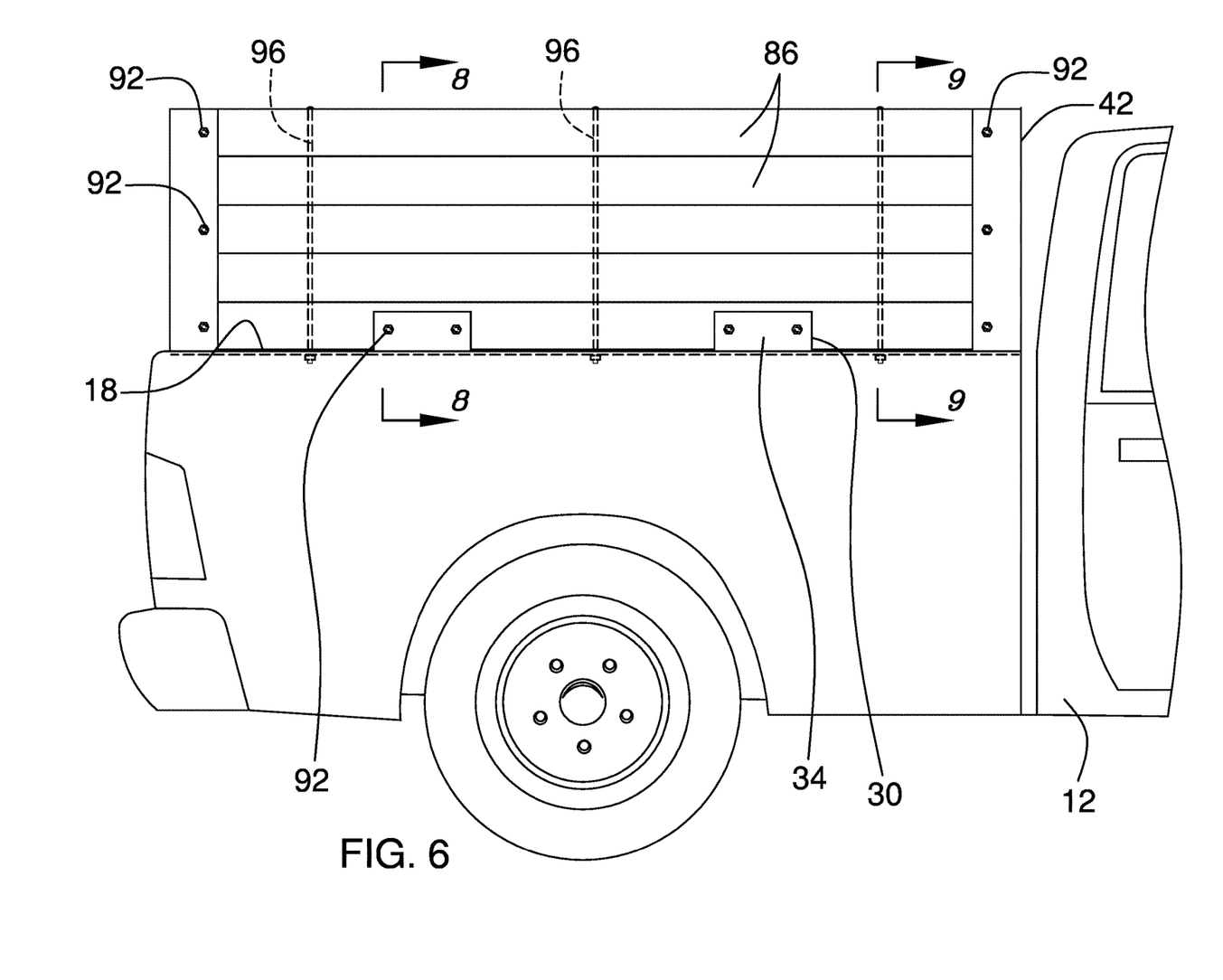
FIG. 6 is a side view of an embodiment of the disclosure.
Figure 7:
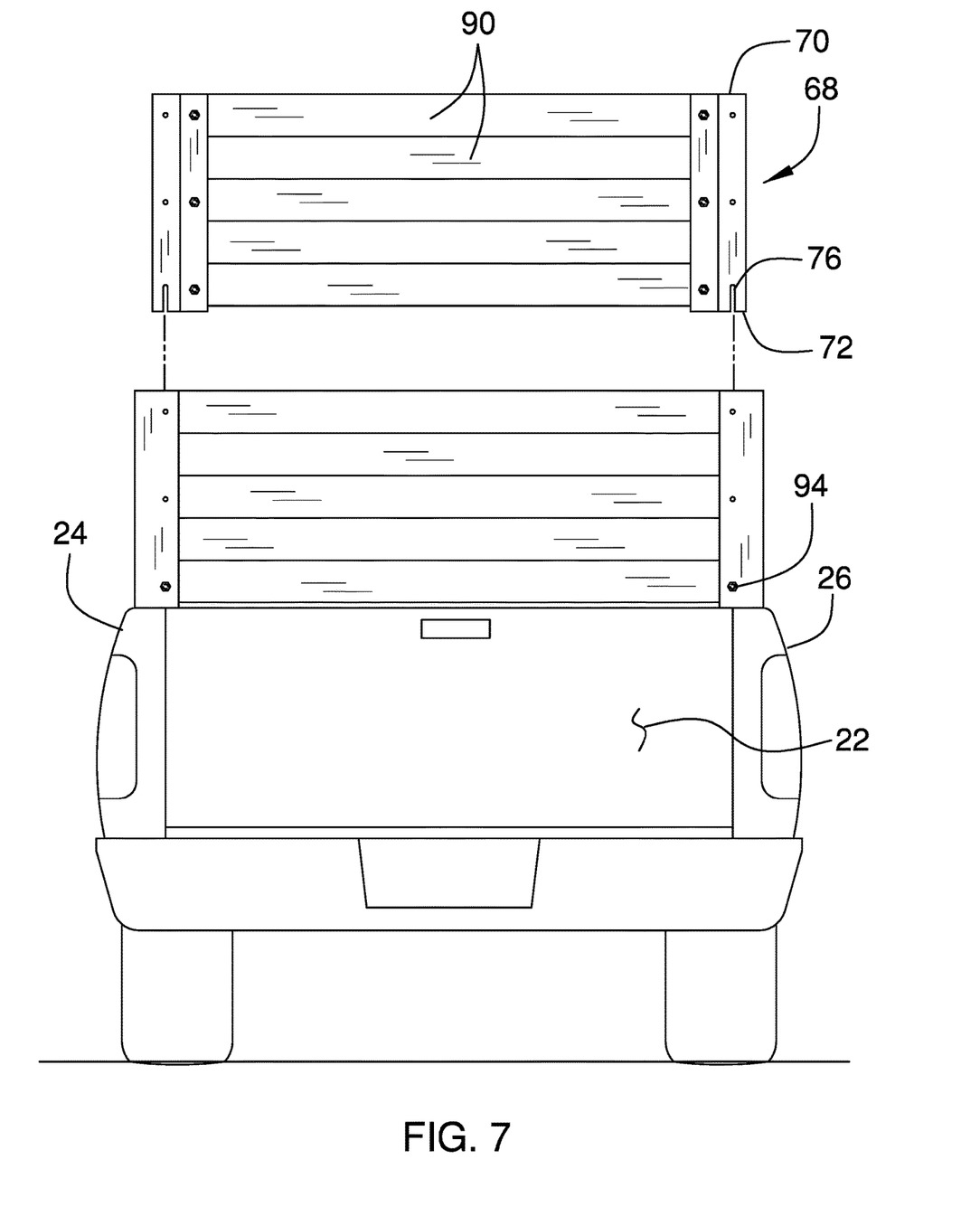
FIG. 7 is a rear view of an embodiment of the disclosure.

A plurality of corner mounts 42 is provided. Each of the corner mounts 42 is positioned on and extends upwardly from one of the corners 20 however the corner mounts 42 remain unattached to the perimeter wall 16. As shown in FIG. 5, each of the corner mounts 42 includes a top end 44, a bottom end 46 and a peripheral wall 48 extending between the top 44 and bottom 46 ends. The top end 44 has a first opening 50 and a second opening 52 each extending downwardly therein. The first 50 and second 52 openings extend through the bottom end 46. The peripheral wall 48 has a first channel 54 and a second channel 56 therein. The first channel 54 extends into the first opening 50 and from the top end 44 to the bottom end 46. The second channel 56 extends into the second opening 52 and from the top end 44 to the bottom end 46. The first channel 54 defines a receiver orientated perpendicular to a receiver defined by the second channel 56.

In one embodiment, each of the corner mounts 42 includes the first channel 54 being formed by a first wall 58, a second wall 60 and a rear wall 62. The second channel 56 is formed by a first lateral wall 64 and a second lateral wall 66 extending perpendicularly away from the first wall 58 such that the first wall 58 forms an end wall for the second channel 56. The second lateral wall 66 is an extension of the rear wall 62 of the first channel 54. Typically, the first channel 54 has a greater depth than the second channel 56 though each may have the same width. The second channels 56 of the corner mounts 42 positioned on the first lateral wall 24 are directed toward each other and the second channels 56 of the corner mounts 42 positioned on the second lateral wall 26 are directed toward each other. The first channels 54 of the corner mounts 42 positioned on the back wall 28 are directed toward each other and the first channels 54 of the corner mounts 42 positioned adjacent to the tailgate 22 are directed toward each other. The depth of the first channels 54 is greater to accommodate different widths of pickup beds 14.

A pair brackets 68 each is provided and each is vertically elongated. Each of the brackets 68 has an upper end 70 and a lower end 72. The brackets 68 each have a slot 74 therein extending laterally into a respective of one of the brackets 68 and through each of the upper 70 and lower 72 ends. Each of the brackets 68 further has a notch 76 therein extending upwardly into the lower end 72 and into the slot 74, wherein the notch 76 extends through a front side and a rear side of a respective one of the brackets 68.

A plurality of slats 80 is provided which are stackable vertically on top of each other to form a wall of a desired height. Each of the slats 80 is elongated and has a first end 82 and a second end 84. The plurality of slats 80 includes a plurality of lateral slats 86, a plurality of end slats 88, and a plurality of tailgate slats 90. At least two of the lateral slats 86 extends between and is engaged with the corner mounts 42 positioned on the first lateral wall 24. At least two of the lateral slats 86 extends between and is engaged with the corner mounts 42 positioned on the second lateral wall 26. The lateral slats 86 extend into the second channels 56 of respective ones of the corner mounts 42. A bottom one of the lateral slats 86 on the first lateral wall 24 and a bottom one of the lateral slats on the second lateral wall 26 is positioned in an associated one of the side wall mounts 30. The side wall mounts 30 thereby retain the lateral slats 86 and the corner mounts 42 on the perimeter wall 16.

At least two of the end slats 88 extends between and is engaged with the corner mounts 42 positioned on the back wall 28. The end slats 88 extend into the first channels 54 of respective ones of the corner mounts 42. At least two of the tailgate slats 90 extends between and is engaged with the brackets 68. One of the brackets 68 is engaged with the corner mount 42 positioned adjacent to the tailgate 22 and one of the brackets 68 is engaged with another one of the corner mounts 42 positioned adjacent to the tailgate 22. The brackets 68 are used with the tailgate slats 90 to allow the user to secure the tailgate slats 90 together in such a manner that they all can simultaneously be inserted or removed from the corner mounts 42 to facilitate access to the pickup bed 14 through the tailgate 22 as needed.

Figure 8:
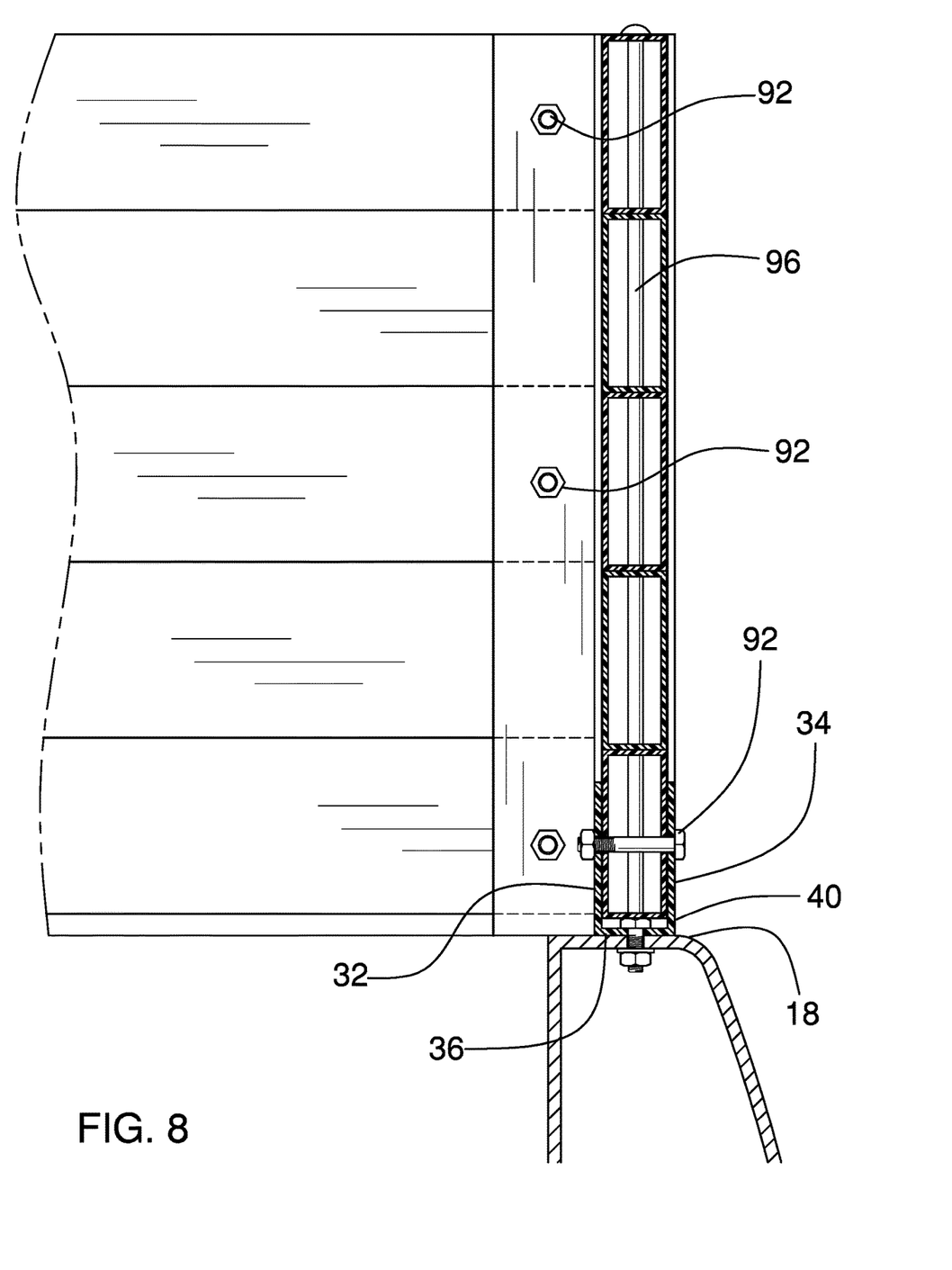
FIG. 8 is a cross-sectional view of an embodiment of the disclosure taken along line 8-8 of FIG. 6.
Figure 9:
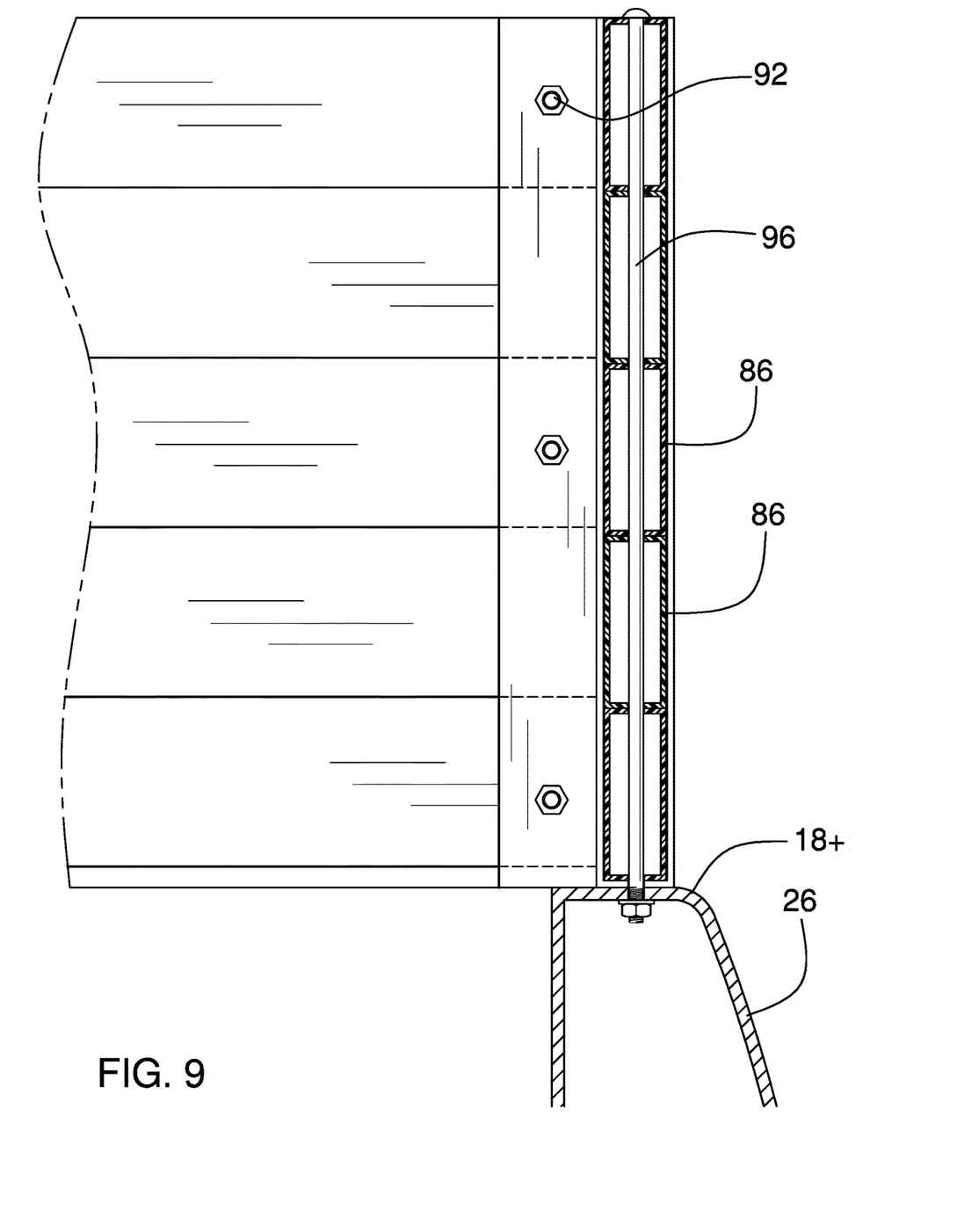
FIG. 9 is a cross-sectional view of an embodiment of the disclosure taken along line 9-9 of FIG. 6.

A plurality of fasteners 92 is provided to secure at least some of the slats 80 to a respective one of the corner mounts 42. Each of the fasteners 92 extends through one of the corner mounts 42 and into at least one of the slats 80 or one of the brackets 68. The fasteners 92 which extend through the brackets 68 also extend through corresponding ones of the tailgate slats 90. Each of the corner mounts 42 has at least four of the fasteners 92 extending therethrough though, as can be seen in the Figures, not all of the slats 80 require fasteners 92. However, only an uppermost one of the lateral 86 and end 88 slats in each vertical stacking thereof requires a fastener 92. The corner mounts 42 positioned adjacent to tailgate 22 each include a pin 94 such that the notches 76 receives one of the pins 94. This allows a user to use a single fastener 92, or no fastener 92, with each bracket 68 so that the brackets 68 can be quickly inserted or removed from the corresponding corner mounts 42. Fasteners 92 may also be extended into the side wall mounts 30 and into lowermost ones of the lateral slats 86 as is shown in FIG. 8.

A plurality of rods 96 is provided. Each of the rods 96 is attached to the perimeter wall 16 and extends upwardly therefrom. The rods 96 may be threaded for receiving nuts to secure the rods 96 to the perimeter wall 16. The first lateral wall 24 and the second lateral wall 26 each typically include at least two of the rods 96. The rods 96 on the first lateral wall 24 extend through all of the lateral slats 86 positioned on the first lateral wall 24, and the rods 96 on the second lateral wall 26 extend through each of the lateral slats 86 on the second lateral wall 26. The rods 96 prevent the slats 80 from flexing inward and outward relative to the pickup bed 14 and consequently make the system 10 more stable when the pickup truck 12 is being driven. Rods 96 may also be attached to and extend upwardly from the back wall 28 to extend through the end slats 88.

Figure 10:
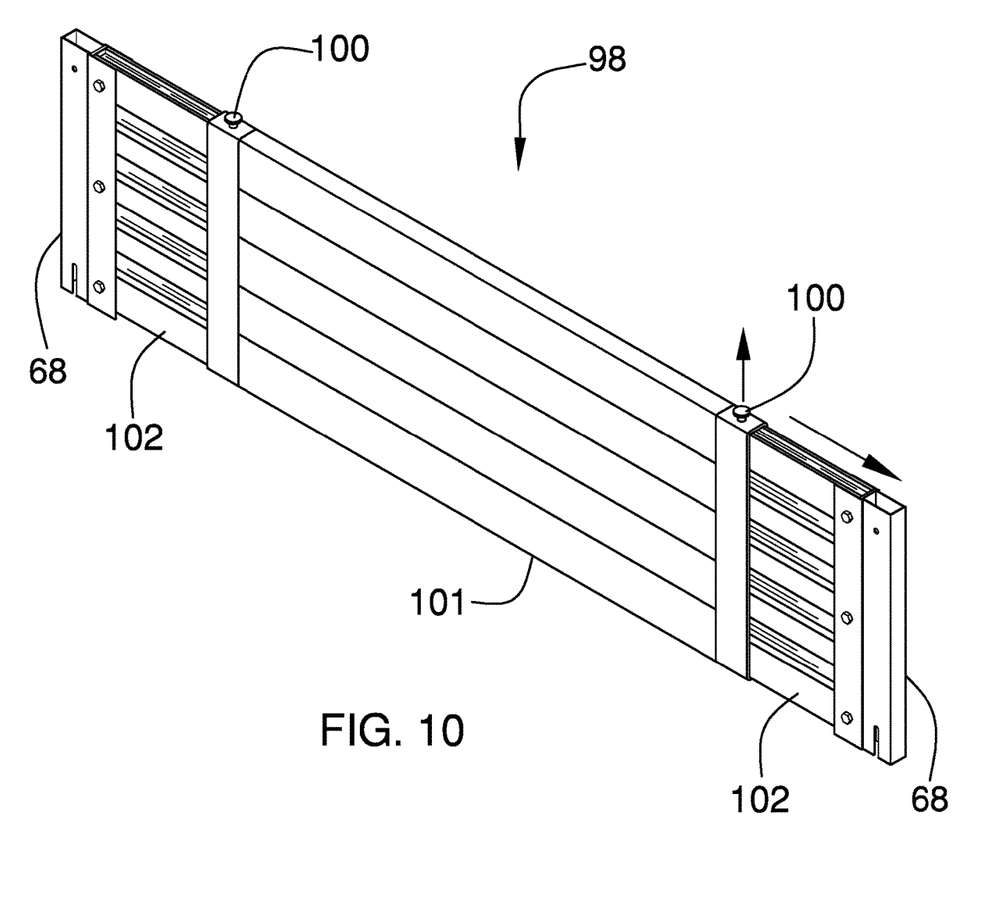
FIG. 10 is an isometric view of an embodiment of the disclosure.

FIG. 10 includes an embodiment incorporating a panel 98, as opposed to slats 80, which can be used for all areas where slats 80 are currently used though which may be best suited for replacement of the end slats 88 and tailgate slats 90. The panel 98 is telescopic to account for width variations in pickup beds 14. Locking tabs 100 may frictionally engage extension members 102 and released to allow the extension members 102 to move laterally with respect to a central member 104 of the panel 98. The panel 98 may comprise a unitary structure or a plurality of telescopic tailgate slats held together by the brackets 68.

In use, the system 10 allows a conventional pickup truck 12 to have a pickup bed 14 with vertically taller walls than is typical of a pickup truck. By utilizing corner mounts 42 which are not attached to the perimeter wall 16, the slats 80 can easily be removed when height extended walls are not required. Further, the system 10 allows for simple retrofitting of height extended walls to any pickup truck 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A modular pickup bed wall height extension system comprising:
   a pickup truck having a pickup bed and a perimeter wall extending upwardly therefrom, said perimeter wall including four corners, said perimeter wall including a tailgate, a first side wall, a second side wall and a back wall, said perimeter wall having an upper edge;
   a plurality of side wall mounts, said upper edge of each of said first and second side walls having at least one of said side wall mounts positioned thereon;
   a plurality of securing members, each of said side wall mounts having at least one securing member extending therethrough and into said perimeter wall to secure said side wall mounts to said perimeter wall;
   a plurality of corner mounts, each of said corner mounts being positioned on and extending upwardly from one of said corners;
   a plurality of slats, each of said slats being elongated and having a first end and a second end, said plurality of slats including a plurality of lateral slats and a plurality of end slats;
   at least two of said lateral slats extending between and being engaged with said corner mounts positioned on said first side wall, at least two of said lateral slats extending between and being engaged with said corner mounts positioned on said second side wall, a bottom one of said lateral slats on said first side wall and a bottom one of said lateral slats on said second side wall being positioned in an associated one of said side wall mounts;
   at least two of said end slats extending between and being engaged with said corner mounts positioned on said back wall; and
   a plurality of fasteners, each of said fasteners extending through one of said corner mounts and into at least one of said slats.

2. The modular pickup bed wall height extension system according claim 1, wherein each of said side wall mounts has bottom wall, an inner wall and an outer wall, a receiving space being defined between said inner and outer walls to receive said lateral slats.

3. The modular pickup bed wall height extension system according claim 1, wherein each of said corner mounts includes:
   a top end and a bottom end and a peripheral wall extending between said top and bottom ends, said top end having a first opening and a second opening each extending downwardly therein, said first and second openings extending through said bottom end,
   said peripheral wall having a first channel and a second channel, said first channel extending into said first opening and from said top end to said bottom end, said second channel extending into said second opening and from said top end to said bottom end, said first channel defining a receiver orientated perpendicular to a receiver defined by said second channel, said first and second channels receiving said slats.

4. The modular pickup bed wall height extension system according claim 3, wherein for each of said corner mounts said first channel is formed by a first wall, a second wall and a rear wall, said second channel being formed by a first lateral wall and a second lateral wall extending perpendicularly away from said first wall such that said first wall forms an end wall for said second channel, said second lateral wall being an extension of said rear wall of said first channel.

5. The modular pickup bed wall height extension system according claim 4, wherein for reach of said corner mounts said first channel has a greater depth than said second channel.

6. The modular pickup bed wall height extension system according claim 4, wherein said second channels of said corner mounts positioned on said first side wall are directed toward each other, said second channels of said corner mounts positioned on said second side wall are directed toward each other, said first channels of said corner mounts positioned on said back wall being directed toward each other, said first channels of said corner mounts positioned adjacent to said tailgate being directed toward each other.

7. The modular pickup bed wall height extension system according claim 1, further including:
   a pair of brackets;
   said plurality of slats including a plurality of tailgate slats;
   at least two of said tailgate slats extending between and being engaged with said brackets, one of said brackets being engaged with said corner mount positioned adjacent to said tailgate and one of said brackets being engaged with another one of said corner mounts positioned adjacent to said tailgate; and
   each of said brackets having at least one of said fasteners extending therethrough.

8. The modular pickup bed wall height extension system according claim 7, wherein said brackets each being vertically elongated, each of said brackets having an upper end and a lower end, each of said brackets having a slot therein extending laterally into a respective of one of said brackets and through each of said upper and lower ends, said tailgate slats extending into said slots of said brackets.

9. The modular pickup bed wall height extension system according claim 8, wherein each of said brackets has a notch therein extending upwardly into said lower end and into said slot, said notch extending through a front side and a rear side of a respective one of said brackets, said corner mounts positioned adjacent to tailgate each including a pin such that said notches receives one of said pins.

10. The modular pickup bed wall height extension system according claim 1, further including a plurality of rods, each of said rods being attached to said perimeter wall and extending upwardly therefrom, wherein said first side wall and said second side wall each include at least two of said rods, said rods on said first side wall extending through all of said lateral slats positioned on said first side wall, said rods on said second side wall extending through each of said lateral slats on said second side wall.

11. The modular pickup bed wall height extension system according claim 10, wherein each of said side wall mounts has bottom wall, an inner wall and an outer wall, a receiving space being defined between said inner and outer walls to receive said lateral slats.

12. The modular pickup bed wall height extension system according claim 10, wherein each of said corner mounts includes:
a top end and a bottom end and a peripheral wall extending between said top and bottom ends, said top end having a first opening and a second opening each extending downwardly therein, said first and second openings extending through said bottom end,
said peripheral wall having a first channel and a second channel, said first channel extending into said first opening and from said top end to said bottom end, said second channel extending into said second opening and from said top end to said bottom end, said first channel defining a receiver orientated perpendicular to a receiver defined by said second channel, said first and second channels receiving said slats.

13. The modular pickup bed wall height extension system according claim 12, wherein for each of said corner mounts said first channel is formed by a first wall, a second wall and a rear wall, said second channel being formed by a first lateral wall and a second lateral wall extending perpendicularly away from said first wall such that said first wall forms an end wall for said second channel, said second lateral wall being an extension of said rear wall of said first channel.

14. The modular pickup bed wall height extension system according claim 13, wherein for reach of said corner mounts said first channel has a greater depth than said second channel.

15. The modular pickup bed wall height extension system according claim 14, wherein said second channels of said corner mounts positioned on said first side wall are directed toward each other, said second channels of said corner mounts positioned on said second side wall are directed toward each other, said first channels of said corner mounts positioned on said back wall being directed toward each other, said first channels of said corner mounts positioned adjacent to said tailgate being directed toward each other.

16. The modular pickup bed wall height extension system according claim 15, further including:
a pair of brackets;
said plurality of slats including a plurality of tailgate slats;
at least two of said tailgate slats extending between and being engaged with said brackets, one of said brackets being engaged with said corner mount positioned adjacent to said tailgate and one of said brackets being engaged with another one of said corner mounts positioned adjacent to said tailgate; and
each of said brackets having at least one of said fasteners extending therethrough.

17. The modular pickup bed wall height extension system according claim 3, further including:
a pair of brackets;
said plurality of slats including a plurality of tailgate slats;
at least two of said tailgate slats extending between and being engaged with said brackets, one of said brackets being engaged with said corner mount positioned adjacent to said tailgate and one of said brackets being engaged with another one of said corner mounts positioned adjacent to said tailgate; and
each of said brackets having at least one of said fasteners extending therethrough.

18. The modular pickup bed wall height extension system according claim 17, further including a plurality of rods, each of said rods being attached to said perimeter wall and extending upwardly therefrom, wherein said first side wall and said second side wall each include at least two of said rods, said rods on said first side wall extending through all of said lateral slats positioned on said first side wall, said rods on said second side wall extending through each of said lateral slats on said second side wall.

19. A modular pickup bed wall height extension system comprising:
a pickup truck having a pickup bed and a perimeter wall extending upwardly therefrom, said perimeter wall including four corners, said perimeter wall including a tailgate, a first side wall, a second side wall and a back wall, said perimeter wall having an upper edge;
a plurality of side wall mounts, said upper edge of each of said first and second side walls having at least one of said side wall mounts positioned thereon, each of said side wall mounts having bottom wall, an inner wall and an outer wall, a receiving space being defined between said inner and outer walls;
a plurality of securing members, each of said side wall mounts having at least one securing member extending therethrough and into said perimeter wall to secure said side wall mounts to said perimeter wall;
a plurality of corner mounts, each of said corner mounts being positioned on and extending upwardly from one of said corners, each of said corner mounts including:
a top end and a bottom end and a peripheral wall extending between said top and bottom ends, said top end having a first opening and a second opening each extending downwardly therein, said first and second openings extending through said bottom end,
said peripheral wall having a first channel and a second channel, said first channel extending into said first opening and from said top end to said bottom end, said second channel extending into said second opening and from said top end to said bottom end, said first channel defining a receiver orientated perpendicular to a receiver defined by said second channel;
said first channel being formed by a first wall, a second wall and a rear wall;
said second channel being formed by a first side wall and a second side wall extending perpendicularly away from said first wall such that said first wall forms an end wall for said second channel, said second side wall being an extension of said rear wall of said first channel, said first channel having a greater depth than said second channel;
said second channels of said corner mounts positioned on said first side wall being directed toward each other, said second channels of said corner mounts positioned on said second side wall being directed toward each other;

said first channels of said corner mounts positioned on said back wall being directed toward each other, said first channels of said corner mounts positioned adjacent to said tailgate being directed toward each other;

a pair brackets each being vertically elongated, each of said brackets having an upper end and a lower end, each of said brackets having a slot therein extending laterally into a respective one of said brackets and through each of said upper and lower ends, each of said brackets having a notch therein extending upwardly into said lower end and into said slot, said notch extending through a front side and a rear side of a respective one of said brackets;

a plurality of slats, each of said slats being elongated and having a first end and a second end, said plurality of slats including a plurality of lateral slats, a plurality of end slats, and a plurality of tailgate slats;

at least two of said lateral slats extending between and being engaged with said corner mounts positioned on said first side wall, at least two of said lateral slats extending between and being engaged with said corner mounts positioned on said second side wall, said lateral slats extending into said first channels of respective ones of said corner mounts, a bottom one of said lateral slats on said first side wall and a bottom one of said lateral slats on said second side wall being positioned in an associated one of said side wall mounts;

at least two of said end slats extending between and being engaged with said corner mounts positioned on said back wall, said end slats extending into said first channels of respective ones of said corner mounts;

at least two of said tailgate slats extending between and being engaged with said brackets, one of said brackets being engaged with said corner mount positioned adjacent to said tailgate and one of said brackets being engaged with another one of said corner mounts positioned adjacent to said tailgate;

a plurality of fasteners, each of said fasteners extending through one of said corner mounts and into at least one of said slats or one of said brackets, wherein each of said corner mounts has at least four of said fasteners extending therethrough, said corner mounts positioned adjacent to tailgate each including a pin such that said notches receives one of said pins; and a plurality of rods, each of said rods being attached to said perimeter wall and extending upwardly therefrom, wherein said first side wall and said second side wall each include at least two of said rods, said rods on said first side wall extending through all of said lateral slats positioned on said first side wall, said rods on said second side wall extending through each of said lateral slats on said second side wall.

\* \* \* \* \*